Patented Dec. 9, 1947

2,432,181

UNITED STATES PATENT OFFICE 2,432,181

VITAMIN RECOVERY

Walter Russell Trent, North Arlington, N. J., assignor to Colgate-Palmolive-Peet Company, Jersey City, N. J., a corporation of Delaware No Drawing. Application August 11, 1944,
Serial No. 549,129

8 Claims. (Cl. 167—81)

The present invention relates to the recovery of valuable constituents of animal and vegetable oils and fats, and, in particular, to novel methods for the recovery of vitamins, sterols, and other constituents of fatty materials.

Heretofore, in the recovery of vitamins and other by-products from fatty materials such as palm oil, cottonseed oil, menhaden oil, wool fat, and the like, it has been usual practice to subject the material directly to extraction or distillation treatment. However, such methods require the treatment of large volumes of material, and, when distillation is employed for separating the by-products, the temperature and length of time required for the separation are frequently so high and prolonged that certain of the desirable constituents, and particularly the vitamins, may be destroyed or adversely affected, and the products obtained may be darkened in color.

In accordance with the present invention, fatty materials containing constituents such as vitamins, sterols, lanolin, or other valuable compounds, are first subjected to an alcoholysis reaction at relatively low temperatures and in the presence of an alcoholysis catalyst, to convert the fatty glycerides and complex esters present into simple alkyl esters. These esters are then separated from the unreacted materials, which include the vitamins and other by-products, whereby the latter constituents are concentrated into a small volume of material which, in turn, may be treated at relatively low temperature and for a short period of time to effect the separation or purification of the vitamins and other desired constituents.

One of the objects of the present invention is to provide novel and economical methods for the recovery of valuable by-products from oils and fatty materials.

Anther object of the invention is to provide methods whereby vitamins, sterols, and other valuable constituents of fatty materials, may be recovered without substantial deterioration thereof.

A further object of the invention is to provide novel methods for concentrating vitamins and other desirable by-products present in oils, fats, and the like, whereby a high yield of the by-products is assured and the color of the products obtained is improved.

These and other objects and features of the invention will appear from the following description thereof, in which specific examples and methods of procedure are cited for the purpose of indicating the nature of the invention, but without intending to limit the invention thereby.

In applicant's copending application, Serial No. 462,370, filed October 17, 1942, methods are described whereby fatty materials, such as animal and vegetable oils and fats, may be treated at low temperatures to convert the fatty glycerides present into fatty acid esters by reacting the fatty glycerides with an alcohol in the presence of an alcoholysis catalyst. This reaction also is adapted for use in treating fatty materials, such as wool fat, for example, whereby complex or high molecular weight esters and compounds are converted into relatively low-boiling alkyl esters by reactions which may be carried out at room temperatures or with moderate heating.

In accordance with the present invention, such reaction products may be treated in various ways to produce a relatively concentrated solution containing the vitamins and other by-products, and this solution is treated to recover valuable constituents therefrom.

In accordance with one method used in treating the reaction products obtained by alcoholysis of the fatty material, the reaction products are flash distilled directly to separate the unreacted alcohol, alkyl esters and glycerine produced, whereby a residue is left which contains the valuable by-products such as vitamins. In the alternative, the alkyl esters of the fatty acids and the glycerine produced by the alcoholysis reaction may be allowed to separate into layers wherein the upper layer contains the alkyl esters and any unreacted glycerides, as well as the unesterified and unsaponified reaction products, including those vitamins, sterols, lanolin, and other by-products which were present in the original oil or fat treated or derived therefrom. The glycerine produced is contained in the lower layer of the reaction products.

When employing the latter method to produce a vitamin-containing concentrate, any alcohol remaining in the upper layer of material is removed and recovered by distillation at reduced temperatures and relatively low pressure, and thereafter the crude esters, free of alcohol, may be separated more readily and completely from the glycerine. The upper ester-containing layer is then passed to distillation apparatus, preferably a vacuum still, where the fatty acid esters are distilled off, in either a batch operation or a continuous operation, leaving the concentrated solution of by-products as a residue.

In separating the alcohol and alkyl esters, it is preferable to employ flash distillation operations in order that the material need be maintained at a high temperature for only short periods of time.

Furthermore, it is found that the exclusion of oxygen during the distillation of the esters and by-products serves to prevent oxidation and discoloration of the alkyl esters and by-products recovered. The admission of air to the distillation apparatus is therefore avoided, or distillation is carried out in an atmosphere of steam, carbon dioxide, nitrogen, or other inert or non-oxidizing gases.

The residue remaining, after separation of the alkyl esters and other constituents of the alcoholysis reaction products by any of the foregoing methods, consists of a relatively small volume of material as compared with the original fatty material treated, and contains unreacted triglycerides and diglycerides as well as the vitamins, sterols, and other valuable by-products, in a high concentration and unimpaired condition. Moreover, when the fatty material treated is of high quality or relatively pure, the residue is substantially free of dark-colored oxidation products.

In recovering vitamins from this residue, the material is subjected to distillation and, preferably, is flash distilled at temperatures of from about 165° C. to 300° C. under a pressure not exceeding about 10 mm. of mercury. For example, the distillation can be carried to a temperature of about 200° C. and under a vacuum of not more than about 10 mm. to remove the monoglycerides and remaining high-boiling esters and further concentrate the material. The distillate coming over at higher temperature and lower pressure then can be treated for the recovery of vitamins, sterols, and the like, by extraction by selective solvents, such as aliphatic, cycloaliphatic and aromatic hydrocarbons, chlorinated hydrocarbons, and, preferably, low-boiling hydrocarbons including butane, hexanes and decanes, or the like. In the alternative, the extraction and isolation of the vitamins may be effected by chromatographic adsorption, crystallization, or other known methods of purifying or separating chemical materials.

The present invention is adapted for use in treating substantially all animal and vegetable oils or fatty materials which contain vitamins or other by-products, and is applicable specifically to fatty materials such as menhaden oil, coconut oil, palm oil, olive oil, cottonseed oil, corn oil, tung oil, wool fat, tallow, whale and fish oils, soya bean oil, tall oil, or the like.

In treating such materials, various alcohols may be used for carrying out the alcoholysis reaction, as described more fully in applicant's co-pending application referred to above. As there pointed out, it is preferable to use short-chain aliphatic alcohols, including aryl substituted aliphatic alcohols, particularly saturated, primary alcohols having a boiling point in the presence of excess water lower than 100° C. at atmospheric pressure, and especially the lower aliphatic alcohols having one to about six carbon atoms per molecule, to form fatty acid esters. Specific alcohols satisfactory for use in the reaction include methyl alcohol, ethyl alcohol, propyl alcohol, isopropyl alcohol, n-butyl alcohol, isobutyl alcohol, tertiary butyl alcohol, the amyl alcohols, benzyl alcohol, etc. It also is preferable to employ an amount of alcohol at least about twice the calculated theoretical amount for alcoholysis of the particular glycerides or fatty materials treated, and to maintain substantially anhydrous conditions during the alcoholysis. Better yields of the fatty acid esters are obtained by mixing the reactants in the cold, say at about room temperature, and then heating the mixture to a higher temperature, than when preheating is employed.

In selecting an alcoholysis catalyst, an alkaline catalyst is preferred. Among those which have been found suitable for use in the present process are sodium hydroxide, sodium methylate, sodium carbonate, soda ash, and lime. While it is possible to obtain good yields of the fatty acid esters with very small amounts of catalyst if sufficient time is allowed for the reaction, proportions of about 0.08 mol to about 0.30 mol of catalyst per mol of fatty glyceride are preferably employed.

Following this reaction, the unreacted alcohol and glycerine and the alkyl esters are separated from the reaction product to produce a by-product-containing concentrate from which the vitamins, sterols, lanolin, or the like, may be readily recovered, in the form of light-colored products and in substantially unimpaired condition, by fractionation of the concentrate or by selective adsorption, crystallization, or otherwise.

In order further to indicate the nature of the present invention, the following examples are cited by way of illustration and not by way of limitation.

Example I

One thousand pounds of palm oil are agitated with 235 pounds of methanol containing 9.2 pounds of NaOH as a catalyst. The reaction proceeds at 45° C. The unreacted methanol is flashed off and the esters produced are flash distilled at 2–4 mm. vacuum, distilling up to 180° C., care being exercised to prevent the entrance of air into the system. The weight of the remaining by-product-containing residue will be about 96 pounds, or 9.6% of the original oil treated.

This residue is transferred to a fractionating column and distilled at 1–3 mm. vacuum, and the following fractions collected:

|  | Pounds |
|---|---|
| Fraction 1, 170°–185° C | 35.0 |
| Fraction 2, 185°–210° C | 15.0 |
| Fraction 3, 210°–230° C | 5.1 |
| Fraction 4, 230°–250° C | 3.6 |
| Fraction 5, 250°–280° C | 0.9 |
| Residue | 36.4 |
|  | 96.0 |

Fraction 1 is mainly methyl esters. Fractions 2 and 3 are combined and refractionated, yielding 13.1 pounds of material comprising mainly methyl esters together with small amounts of mono- and diglycerides and yielding 7.0 pounds of carotene (vitamin A)-containing material which is combined with fraction 4 to make a total of 10.6 pounds of crude, carotene-containing material. This material is further purified by extraction twice with five volumes of equal parts of petroleum ether (as "Skellysolve C") and 90% methanol, the carotene remaining in the petroleum ether layer. Upon flash distilling off the petroleum ether, there remains 3.6 pounds of crude carotene which is vacuum distilled at 1 mm. mercury to yield 2.1 pounds of carotene boiling at 220°–250° C.

Example II

The 10.6 pounds of crude carotene-containing material are distilled at 230°–260° C. with a stream of steam from a ninety-pound steam main bled into the distillation vessel. The distillate, upon separation of the water layer, will give about 4.4 to 5.1 pounds of crude carotene, which is further purified by chromatographic adsorption on magnesia, using petroleum ether as a solvent, yielding 2.45 pounds of carotene.

Example III

Five hundred pounds of menhaden oil are treated with 112 pounds of methanol containing 5.64 pounds of caustic soda as a catalyst. The reaction is carried out at room temperature.

The resulting reaction product is flash distilled to remove unreacted alcohol, whereupon the product separates into upper and lower liquid layers. The lower glycerine-containing layer is drawn off, and the upper layer, containing the alkyl esters and vitamin D, is flash distilled at temperatures up to 170° C. under a pressure of from 1 to 3 mm. of mercury. The residue will consist of about 51.0 pounds of a relatively concentrated solution of vitamin D. This residue can be used directly in cattle food and elsewhere where crude vitamin-containing concentrates are employed. However, it may be extracted twice with a mixture of equal parts of benzene and 90% methanol, the vitamin D going into the benzene layer. After flashing off the benzene, 4.8 to 5.4 pounds of still more concentrated oil will remain.

To obtain the substantially pure vitamin, the latter oil concentrate is flash distilled under conditions to collect the fraction boiling at 180°–220° C. at 1 mm. A yield of 3.1 pounds of vitamin D is thus obtained and may be further purified, if desired, by chromatographic adsorption on aluminum oxide, yielding 1.9 pounds of the final product.

Example IV

One thousand pounds of cottonseed oil are converted to methyl esters and free glycerine by alcoholysis with 241 pounds of methanol containing 8.1 pounds of sodium hydroxide as a catalyst. The excess methanol is flashed off and the esters and glycerine flash distilled without the separation of a glycerine layer, leaving a distillation residue of about 100 pounds. This residue, in turn, is flash distilled under a pressure of 2 mm. of mercury, and a fraction collected which comes over at temperatures of from 190° to 200° C. The weight of this fraction will be about 2.4 pounds. This 2.4 pounds of material contain vitamin E (tocopherols), and can be used as such as an anti-oxidant for soaps, oils, etc., alone or admixed with other preservatives.

If preferred, the concentrate can be further purified to obtain the vitamin E concentrated therein. For this purpose, the concentrate may be subjected to molecular distillation, whereby from 1.30 to 1.55 pounds of substantially pure vitamin E are obtained.

In a further alternative treatment of the 2.4 pounds of concentrate obtained as described above, the material is extracted with equal parts of 90% methanol and petroleum ether, the tocopherol going mainly into the petroleum ether phase. Upon flashing off the petroleum ether, 1.8 pounds of tocopherol-containing material are obtained.

If partially hydrogenated cottonseed oil is used as the starting material for the alcoholysis in the foregoing example, esters more valuable for soap making are produced, and the vitamin concentrate is more stable against auto-oxidation.

The concentrate produced may be subjected to chromatographic adsorption in petroleum ether solution on aluminum oxide to effect further purification of the tocopherols recovered.

Example V

Alcoholysis is performed on wool grease which has been preheated and pumped into a heated vacuum chamber to flash off the moisture. After alcoholysis treatment as described above, the pH value of the reaction product is adjusted to 5.0. The reaction products are then flash distilled to obtain the fatty acid esters boiling up to 230° C. under a pressure of 2–3 mm. of mercury, after which the residue containing the cholesterol, cetyl alcohol and lanolin is flash distilled at 1 mm. vacuum to recover and isolate these constituents.

In each of the foregoing examples, the reactions by which the alcoholysis reaction products are obtained are carried out at low temperatures, and the saponification of the vitamin-containing concentrate is avoided. In this way, the conditions under which the concentrate is produced and treated serve to insure the recovery of the by-products without appreciable deterioration thereof. Furthermore, the volume of the material distilled or extracted in the actual recovery of the vitamins is generally less than 10% of the volume of the oil or fatty material itself.

The present invention also renders it possible to treat a wide variety of fatty materials to recover by-products therefrom in an economical manner. The specific examples cited above are, therefore, only cited as typical of preferred practice in accordance with the present invention, and are not intended to limit the scope of the invention.

This application is a continuation-in-part of copending application Serial No. 462,370, filed October 17, 1942.

I claim:

1. A process for the recovery of vitamins, sterols and other valuable constituents from fatty glycerides containing the same which comprises the steps of reacting a fatty glyceride with aliphatic monohydric alcohol having from one to about six carbon atoms per molecule in the presence of an alkaline alcoholysis catalyst, adjusting the pH of the reaction product to about 5, flash distilling the reaction product to vaporize and remove unreacted alcohol, glycerine and esters of fatty acids and said alcohol having a boiling point substantially lower than said vitamins, sterols and other valuable constituents, and recovering valuable constituents from the residue of said flash distillation.

2. The process as set forth in claim 1 in which said fraction is treated with a solvent selective for said desired valuable constituent, separating the solvent layer and distilling out the solvent.

3. The process as set forth in claim 1 in which said fraction is treated with a chromatographic adsorbent for said valuable constituent, and the adsorbed material recovered therefrom.

4. The process as set forth in claim 1 in which the treatment of said fraction includes fractional distillation at a pressure not exceeding about 1 mm. of mercury.

5. A process for the recovery of a valuable constituent contained in the lower monohydric alcohol esters of fatty acids obtained by alcoholysis of a fat containing said constituent which comprises flash distilling the material under such conditions that the esters are largely vaporized and a residue containing practically all the valuable constituent is obtained, distilling said residue under such conditions that a major portion of the valuable constituent is vaporized, and condensing said vapor remote from said residue whereby a concentrate of said valuable constituent is obtained.

6. The process as set forth in claim 5 in which the valuable constituent is carotene and the vapor thereof is obtained within the temperature range of about 185° to 260° C. at about 1 to 3 mm. of mercury.

7. The process as set forth in claim 5 in which the valuable constituent is vitamin D and the vapor thereof is obtained by flash distillation within the temperature range of about 180° to 220° C. at about 1 mm. of mercury.

8. The process as set forth in claim 5 in which the valuable constituent is vitamin E and the vapor thereof is obtained by flash distillation within the temperature range of about 190° to 200° C. at 2 mm. of mercury.

WALTER RUSSELL TRENT.

REFERENCES CITED

The following references are of record in the file of this patent:

UNITED STATES PATENTS

| Number | Name | Date |
|---|---|---|
| 2,263,550 | Andrews | Nov. 18, 1941 |
| 2,293,551 | Kunz | Aug. 18, 1942 |
| 2,032,006 | Cross | Feb. 25, 1936 |

FOREIGN PATENTS

| Number | Country | Date |
|---|---|---|
| 415,088 | Great Britain | Aug. 17, 1934 |

OTHER REFERENCES

Grandel et al., Application Ser. No. 414,980, published by the Alien Property Custodian, May 11, 1943, 167–81, Box 1.

Rosenberg, Bull de Biologie et de Med. Ex. U. S. S. R. 5, 363–4. (Copy in 260–666C.)